(12) United States Patent  
Shimizu

(10) Patent No.: US 7,764,452 B2
(45) Date of Patent: Jul. 27, 2010

(54) METHOD FOR MANUFACTURING CEMENTED LENS, CEMENTED LENS AND PROJECTOR APPARATUS

(75) Inventor: Hitoshi Shimizu, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 100 days.

(21) Appl. No.: 11/546,408

(22) Filed: Oct. 12, 2006

(65) Prior Publication Data

US 2007/0091473 A1  Apr. 26, 2007

(30) Foreign Application Priority Data

Oct. 14, 2005 (JP) ............... P2005-300203
Dec. 7, 2005 (JP) ............... P2005-353842

(51) Int. Cl.
*G02B 7/00* (2006.01)
(52) U.S. Cl. ............... 359/896; 359/642; 359/793; 359/796
(58) Field of Classification Search ............... 359/642, 359/754, 793, 796, 896; 156/99, 107
See application file for complete search history.

(56) References Cited

U.S. PATENT DOCUMENTS 5,570,237 A * 10/1996 Sato ............... 359/797
6,115,194 A * 9/2000 Yoneyama ............... 359/757
6,421,190 B1 * 7/2002 Abe ............... 359/796
6,919,996 B2 * 7/2005 Wada et al. ............... 359/719

FOREIGN PATENT DOCUMENTS

| JP | 4-147102 A | 5/1992 |
| JP | 5-019106 A | 1/1993 |
| JP | 7-41339 A | 10/1995 |
| JP | 2000-171610 A | 6/2000 |
| JP | 2002-193644 A | 7/2002 |

\* cited by examiner

*Primary Examiner*—Darryl J Collins
(74) *Attorney, Agent, or Firm*—Birch, Stewart, Kolasch & Birch, LLP

(57) ABSTRACT

A cemented lens is produced by cementing a first lens having a concave surface with a second lens having a convex surface. The second lens is placed on the concave surface of the first lens to align the concave surface with the convex surface. Adhesive is dropped in each predetermined place around the second lens by a predetermined quantity to abut against an outer circumferential end of the second lens. The position of the second lens is adjusted. The adhesive is irradiated with ultraviolet light. Thus, the outer circumferential end of the second lens is bonded with the concave surface of the first lens. There is no bonding layer between the cementing surfaces as in the related art. There is no fear that light passes through the bonding layer. It is therefore unnecessary to consider deterioration of optical performance caused by deformation of the adhesive exposed to intensive light.

17 Claims, 8 Drawing Sheets

FIG. 3A
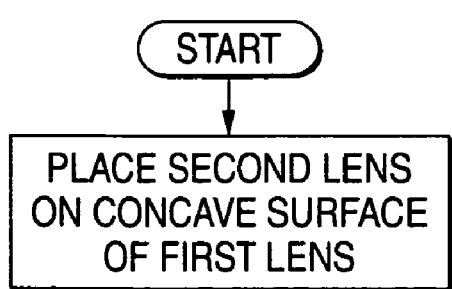
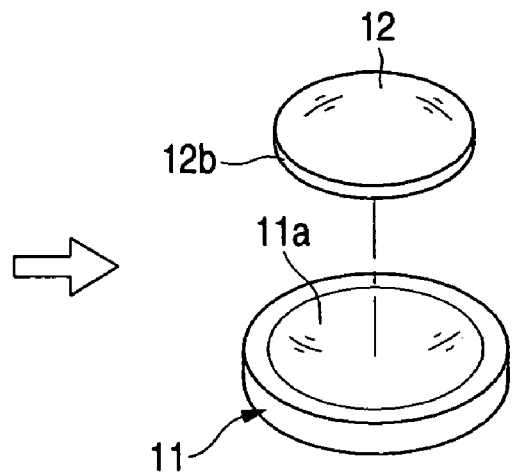
FIG. 3B
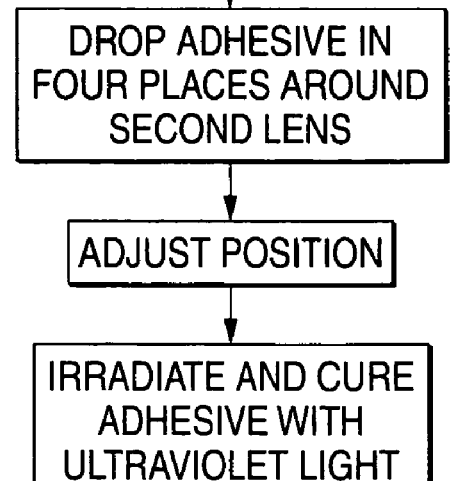
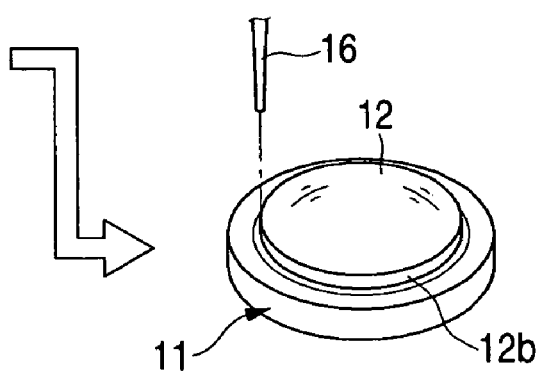

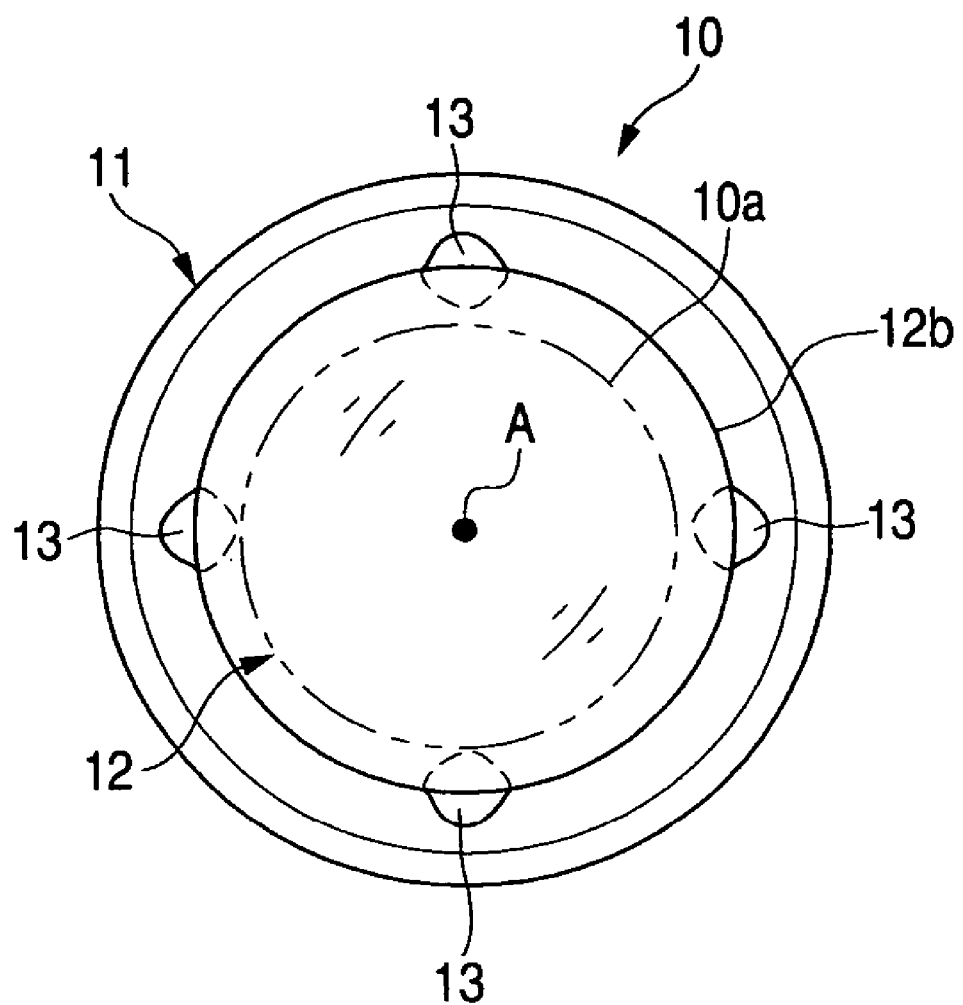

METHOD FOR MANUFACTURING CEMENTED LENS, CEMENTED LENS AND PROJECTOR APPARATUS

BACKGROUND OF THE INVENTION

1. Technical Field

The invention relates to a cemented lens including at least two lenses cemented through cementing surfaces one of which is a concave surface of one of the lenses and the other of which is a convex surface of the other of the lenses, a method for manufacturing the cemented lens, and a projector apparatus using the cemented lens.

2. Description of the Related Art

As shown in FIGS. 8A and 8B, there has been known a cemented lens 50 composed of two lenses, that is, a first lens 51 and a second lens 52 cemented through cementing surfaces. One of the cementing surfaces is a concave surface 51a of the first lens 51. The other of the cementing surfaces is a convex surface 52a of the second lens 52. The cemented lens 50 configured thus is, for example, used as a lens for correcting chromatic aberration in an optical system of a projector apparatus etc. for projecting image light on a screen to thereby display an image. For example, the cemented lens 50 is produced as follows (for example, see JP Hei. 7-41339). That is, transparent adhesive 53 is applied uniformly substantially all over the concave surface 51a of the first lens 51. The concave surface 51a and the convex surface 52a of the second lens 52 are then put on top of each other and bonded with each other. Thus, the concave surface 51a and the convex surface 52a are cemented. In the cemented lens 50 produced thus, the adhesive 53 is inserted between the cementing surface of the first lens 51 and the cementing surface of the second lens 52. As a result, the adhesive 53 is put into an effective area including the optical axis positions of the lenses 51 and 52 and serving as a chief optical path of the cemented lens 50.

However, there is a problem that the cemented lens 50 of the related art cannot be used in a place exposed to intensive light, for example, in a place close to an exit pupil of a projection lens for the project or apparatus. When the adhesive 53 is exposed to intensive light, the adhesive 53 is apt to be deformed to thereby cause discoloring of light. When the adhesive 53 is located in the effective area as in the cemented lens 50, transmitted light may be discolored and attenuated due to the deformation of the adhesive 53. When the cemented lens 50 is disposed near the exit pupil, the lens diameter of the cemented lens 50 becomes small. Therefore, the energy of light per unit area becomes so high that there arises a problem particularly. Thus, it is difficult to use the cemented lens 50 in a site exposed to intensive light, and the degree of freedom in designing the optical system is restricted.

SUMMARY

The invention provides a cemented lens, which can be disposed in a site exposed to intensive light, for example, near an exit pupil of a projection lens for a projector apparatus.

According to an aspect of the invention, a method manufactures a cemented lens comprising at least a first lens and a second lens. The cemented lens is cemented through cementing surfaces of the first and second lenses. One of the cementing surfaces is a concave surface of one of the first and second lenses. The other of the cementing surfaces is a convex surface of the other of the first and second lenses. The method includes: putting the cementing surfaces on each other; and thereafter applying an adhesive to a circumferential end portion in a state where the first and second lenses are put on each other so as to bond the first and second lenses with each other through the adhesive, the circumferential end portion being located out of effective areas serving as chief optical paths of the first and second lenses.

Also, the circumferential end portion may include circumferential edges of the cementing surfaces. When there is a difference in diameter between the cementing surface of the first lens and the cementing surface of the second lens, the adhesive may be applied to a joint between an outer circumferential end of the small-diameter one of the first and second lenses and the circumferential edge of the large-diameter one of the first and second lenses.

According to another aspect of the invention, a method manufactures a cemented lens comprising at least a first lens and a second lens. The cemented lens is cemented through cementing surfaces of the first and second lenses. One of the cementing surfaces is a concave surface of one of the first and second lenses. The other of the cementing surfaces is a convex surface of the other of the first and second lenses. The method includes: applying an adhesive to a circumferential end portion of at least one of the first and second lenses, the circumferential end portion being located out of effective areas serving as chief optical paths of the first and second lenses; and thereafter putting the cementing surface of the other of the first and second lenses on the cementing surface of the one of the first and second lenses, so as to bond the first and second lenses with each other through the adhesive.

Also, the circumferential end portion may include circumferential edges of the cementing surfaces. The adhesive may be applied to the circumferential edges.

For example, a curvature of the concave surface is equal to that of the convex surface.

Also, a UV-curing adhesive to be cured by irradiation with ultraviolet light may be used as the adhesive. The method may further include: after the UV-curing adhesive is applied to the circumferential end portion, adjusting a bonding position of one of the first and second lenses relative to the other; and thereafter irradiating the UV-curing adhesive with ultraviolet light so as to cure the UV-curing adhesive.

Also, the adhesive may be applied to at least three places in the circumferential end portion. The places to be applied with the adhesive may be disposed at substantially equal intervals.

According to further another aspect of the invention, a cemented lens includes at least a first lens and a second lens. The cemented lens is cemented through cementing surfaces of the first and second lenses. One of the cementing surfaces is a concave surface of one of the first and second lenses. The other of the cementing surfaces is a convex surface of the other of the first and second lenses. The first and second lenses are bonded with each other through an adhesive applied to a circumferential end portion, which is located out of effective areas serving as chief optical paths of the first and second lenses.

The circumferential end portion may include circumferential edges of the cementing surfaces. Furthermore, a curvature of the concave surface may be equal to that of the convex surface.

Also, the adhesive may be a UV-curing adhesive to be cured by irradiation with ultraviolet light. In addition, the adhesive may be applied to at least three places in the circumferential end portion. The places to be applied with the adhesive may be disposed at substantially equal intervals.

According to still another aspect of the invention, a projector apparatus includes a projection unit and a group of lenses. The projection unit optically modulates light from a light source to thereby generate image light. The projection unit projects the image light on a screen to thereby display an image. The group of lenses is incorporated in the projection unit. The above-described cemented lens is used as one of the group of lenses.

According to the above configurations, at least two lenses one of which has a concave surface and the other of which has a convex surface are cemented through the concave surface and the convex surface as cementing surfaces. In this event, the lenses are bonded by adhesive applied to a circumferential end portion located out of an effective area serving as a chief optical path of each lens. Thus, there is no fear that light passes through a bonding layer formed between two lenses as in a background-art cemented lens. It is therefore unnecessary to take into consideration the deterioration of optical performance of adhesive in a cemented lens when an optical system using the cemented lens is designed. The degree of freedom in selecting the layout position of the cemented lens can be increased.

BRIEF DESCRIPTION OF THE DRAWINGS

FIGS. 3A and 3B are a flow chart showing a procedure to manufacture the cemented lens.

FIG. 5 is a plan view of the cemented lens manufactured in the manufacturing procedure in FIGS. 4A and 4B.

DETAILED DESCRIPTION OF EMBODIMENTS OF THE INVENTION

Figure 1A:
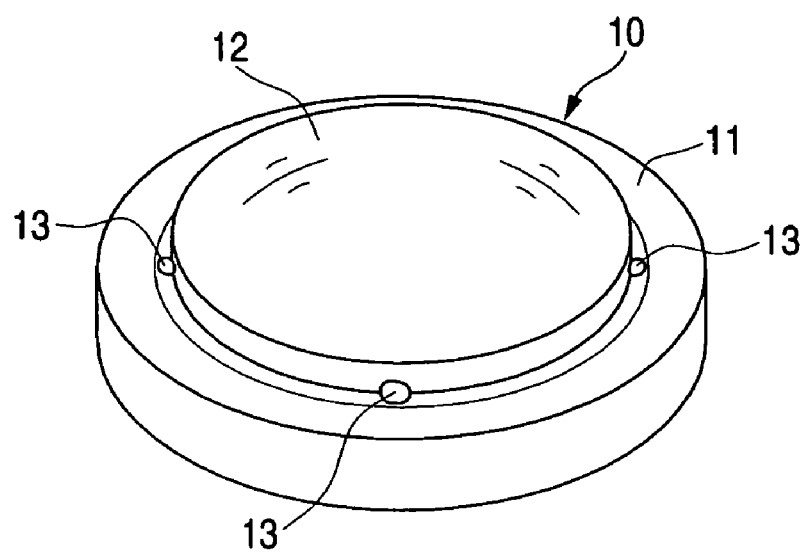
FIGS. 1A and 1B are an outline view and a sectional view of a cemented lens.
Figure 1B:
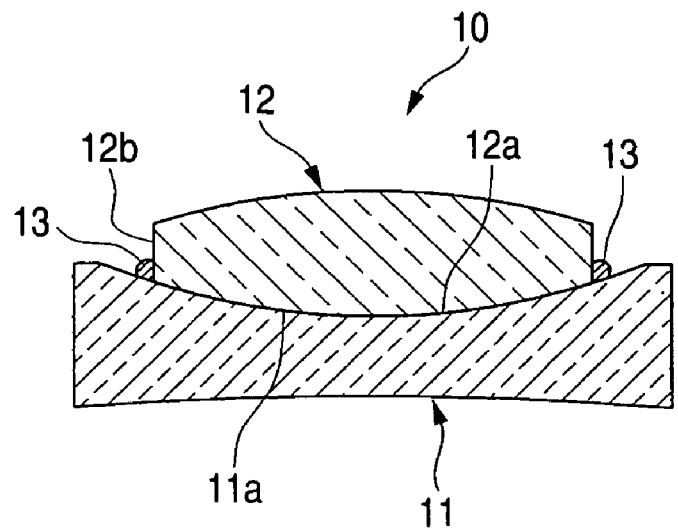
Figure 2A:
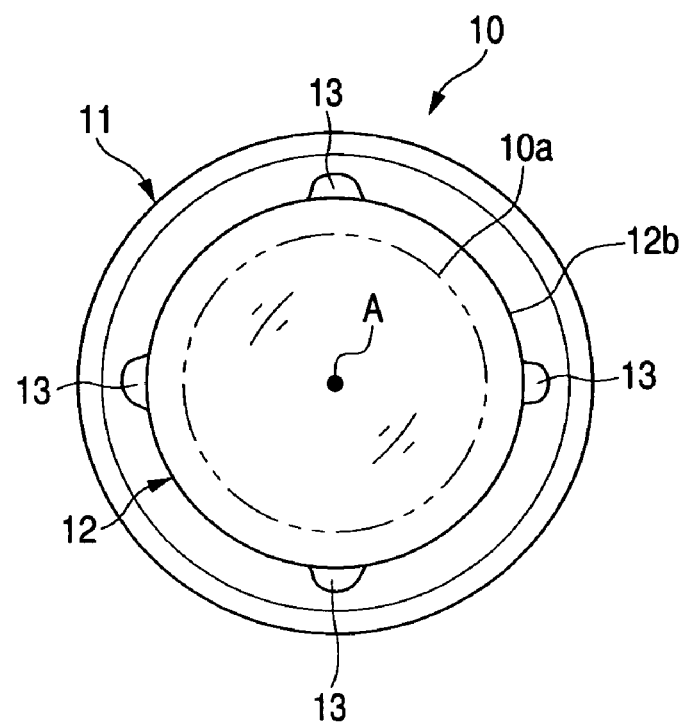
FIGS. 2A and 2B are explanatory views of a method for bonding the cemented lens.
Figure 2B:
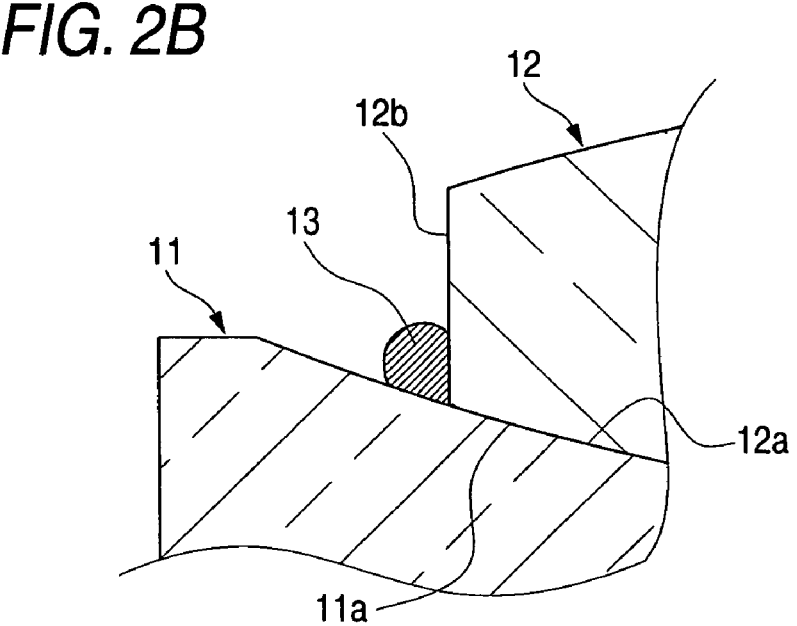

A cemented lens 10 shown in FIGS. 1A and 1B includes two lenses, i.e. a first lens 11 having a concave surface 11a and a second lens 12 having a convex surface 12a. For example, the first lens 11 is a concave lens having a negative refracting power, and the second lens 12 is a convex lens having a positive refracting power. The concave surface 11a of the first lens 11 and the convex surface 12a of the second lens 12 have one and the same curvature. The first lens 11 and the second lens 12 are cemented through the concave surface 11a and the convex surface 12a as cementing surfaces. As shown in FIGS. 2A and 2B, the first lens 11 and the second lens 12 are bonded by adhesive 13 in a circumferential end portion located out of their effective area 10a.

The effective area 10a is a chief area which will serve as a chief optical path including an optical axis A of the cemented lens 10, and which includes the centers of the lens surfaces of the lenses 11 and 12 including the concave surface 11a and the convex surface 12a. The circumferential end portion is a portion of the outer circumferential surface of each lens 11, 12, which portion is located out of the effective area 10a and which includes a peripheral portion (circumferential edge) of the lens surface of each lens 11, 12 excluding the effective area 10a, and an outer circumferential end of the lens.

The outer diameter of the second lens 12 is one size smaller than that of the first lens 11. When the concave surface 11a of the first lens 11 and the convex surface 12a of the second lens 12 are put on top of each other so that the centers of the both coincide with each other, the circumferential edge of the concave surface 11a of the first lens 11 protrudes from an outer circumferential end 12b of the second lens 12. The adhesive 13 is applied to the joint between the circumferential edge of the concave surface 11a of the first lens 11 and the outer circumferential end 12b of the second lens 12. The second lens 12 is bonded and fixed to the first lens 11 by the adhesive 13. Since the circumferential edge of the concave surface 11a of the first lens 11 and the outer circumferential end 12b of the second lens 12 are circumferential end portions of the lenses 11 and 12, there is no fear that the adhesive 13 is put into the effective area 10a.

Thus, there is no fear that light passes through a bonding layer located in the effective area as in the background-art cemented lens. It is therefore unnecessary to take into consideration the deterioration of optical performance caused by deformation of the adhesive exposed to intensive light. Thus, the degree of freedom in selecting the layout position of the cemented lens 10 in design of an optical system is improved. Therefore, the cemented lens 10 can be disposed in a site exposed to intensive light, for example, near an exit pupil of a projection lens of a projector apparatus.

As shown in FIG. 2A, the adhesive 13 is, for example, applied to four places at a substantially equal interval around the second lens 12. Through the four places, the second lens 12 is bonded and fixed to the first lens 11. Bonding in four places is only one example. Bonding may be performed in three places or in four or more places.

The adhesive 13 is dropped in each predetermined position by a predetermined quantity, for example, by use of a dispenser 16 (see FIG. 3B) or the like. The adhesive 13 is dropped in the joint between the outer circumferential end 12b of the second lens and the concave surface 11a of the first lens. As shown in FIG. 2B, the outer circumferential end 12b of the second lens 12 and the concave surface 11a of the first lens 11 are bonded with each other by the adhesive 13. The adhesive 13 may be applied in any one of various methods including the method for dropping the adhesive 13 by use of the dispenser 16 or the like, a method for applying the adhesive 13 by use of a brush, etc.

When there occurs a very small gap between the concave surface 11a and the convex surface 12a, there is also a fear that the adhesive 13 may penetrate the gap. The quantity of the adhesive 13 penetrating the gap should be made as small as possible. To suppress the quantity, it is preferable to use a comparatively high-viscosity adhesive as the adhesive 13. For example, the viscosity of the adhesive 13 is preferably not lower than 2,000 mPa·s and not higher than 50,000 Pa·s, more preferably 31,000±5,000 mPa·s.

UV-curing adhesive to be cured by irradiation with ultraviolet light is used as the adhesive 13. The adhesive 13 is irradiated and cured with ultraviolet light after adjustment of the cemented position where one of the first and second lenses 11 and 12 is cemented with the other.

The adjustment of the position is performed in the following manner. That is, for example, in the state where the second lens 12 has been put on the first lens 11, the lens surface of one of the lenses 11 and 12 is irradiated with light from a light source (not shown). The light transmitted through the lens surfaces is received by an imaging device (not shown) such as a CCD image sensor. While an image of the received light is monitored, the second lens 12 is moved so that the optical axis of the second lens 12 coincides with the optical axis of the first lens 11. The second lens 12 is moved by use of a jig or manually.

With reference to FIGS. 3A-3B, the procedure to manufacture the cemented lens 10 will be described below. The first lens 11 is set in a lens holder (not shown) with the concave surface 11a up. The second lens 12 is put on the concave surface 11a of the first lens 11 with the convex surface 12a down. After that, the adhesive 13 is dropped in each of predetermined four places around the second lens 12 by a predetermined quantity by the dispenser 16. The adhesive 13 is applied to a joint between the outer circumferential end 12b of the second lens 12 and the concave surface 11a of the first lens 11. Thus, the outer circumferential end 12b of the second lens 12 and the circumferential edge of the concave surface 11a of the first lens 11 are bonded through the adhesive 13. After that, positional adjustment is performed on the cemented position of the second lens 12 in the aforementioned procedure. After the positional adjustment is terminated, the dropped adhesive 13 is irradiated with ultraviolet light and cured.

Figure 4A:
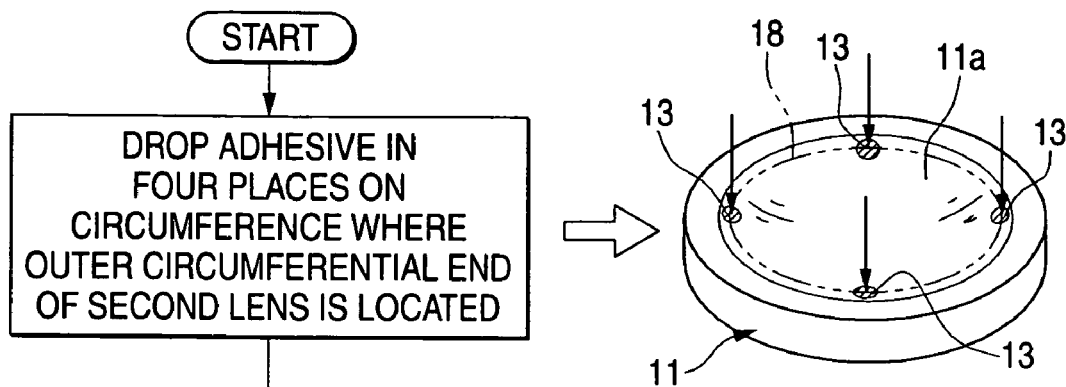
FIGS. 4A and 4B are a flow chart showing another procedure to manufacture the cemented lens.
Figure 4B:
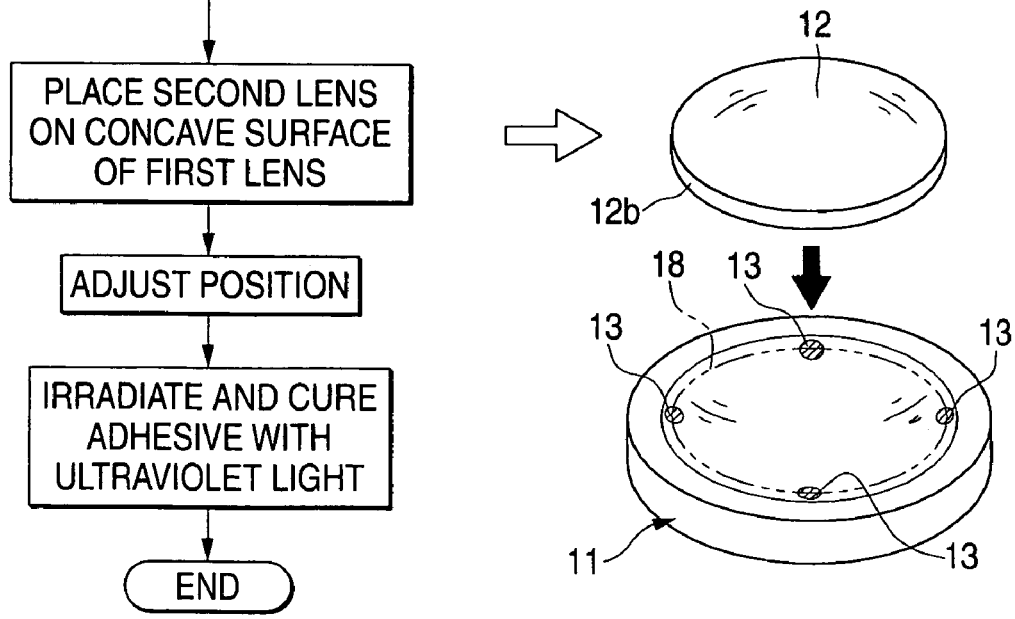

The embodiment has been described along an example in which the second lens is put on the first lens so as to align their cementing surfaces, and the adhesive is then applied thereto so as to cement the both. However, the first lens 11 and the second lens 12 may be cemented as shown in FIGS. 4A and 4B. That is, the adhesive 13 is applied to the cementing surface (concave surface 11a) of the first lens 11. After that, the second lens 12 is put on the concave surface 11a of the first lens 11 so as to align their cementing surfaces.

In this case, first, the adhesive 13 is dropped in a plurality of places on a circumference 18 which is a circumferential edge of the concave surface 11a of the first lens 11 and where the outer circumferential end 12b of the second lens 12 will be located when the second lens 12 is cemented with the concave surface 11a. After that, the second lens 12 is put on the concave surface 11a having the adhesive 13 dropped thereon. The concave surface 11a and the convex surface 12a are aligned. Drops of the adhesive 13 dropped on the circumference 18 are held and squashed between the concave surface 11a and the convex surface 12a.

As shown in FIG. 5, a part of the adhesive 13 penetrates between the concave surface 11a and the convex surface 12a as shown in the broken line, so as to bond the concave surface 11a and the convex surface 12a at their circumferential edges. On the other hand, the rest adhesive 13 protrudes to the outside of the second lens 12 so as to bond the outer circumferential end 12b and the concave surface 11a with each other. After the second lens 12 is moved to adjust the cemented position, the adhesive 13 is cured. Thus, the second lens 12 is fixed to the first lens 11. A part of the adhesive 13 penetrates between the concave surface 11a and the convex surface 12a, but stays in their circumferential edges. There is no fear that the adhesive 13 enters the effective area 10a. Therefore, there is no fear that the adhesive 13 enters the optical path.

The embodiment has been described along an example where the adhesive is dropped on the first lens. However, the adhesive may be dropped on the second lens, or on both the lenses. The adhesive may be applied in the same method as in the first embodiment, or in another method for applying the adhesive without dropping the adhesive.

The embodiment has been described along an example where a first lens having a large outer diameter and a concave surface and a second lens having a small outer diameter and a convex surface are cemented. However, arrangement may be made so that a first lens having a large outer diameter and a convex surface and a second lens having a small outer diameter and a concave surface are cemented. In this case, the convex surface of the first lens is set to look upward, and the second lens is put on the convex surface with its concave surface down. The first and second lenses are cemented in such postures.

Figure 6A:
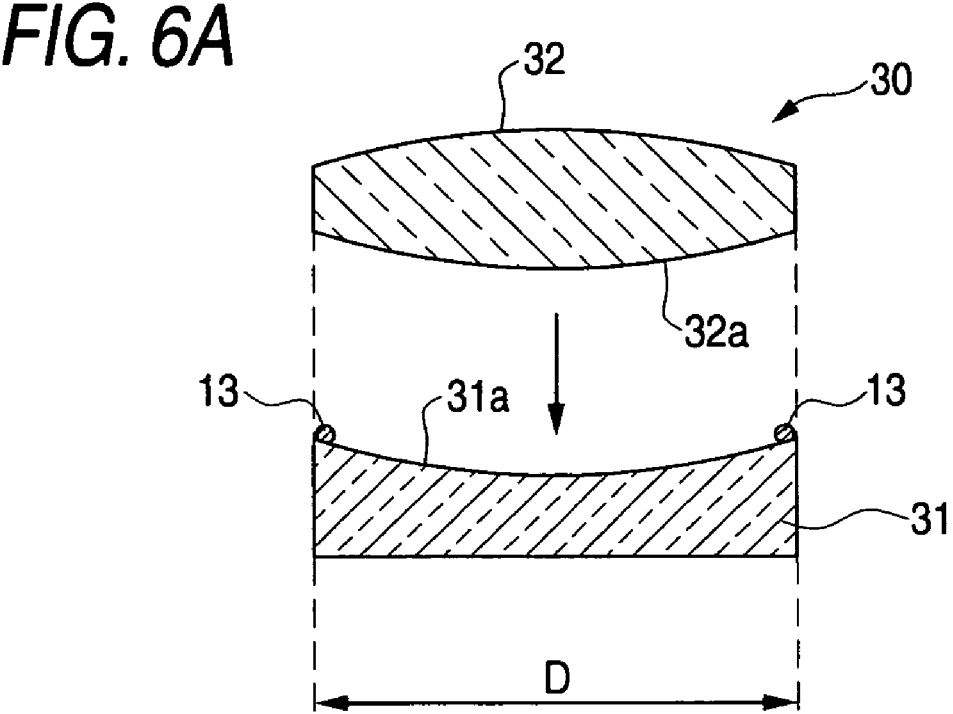
FIGS. 6A and 6B are explanatory views of a cemented lens including two lenses having one and the same outer diameter.
Figure 6B:
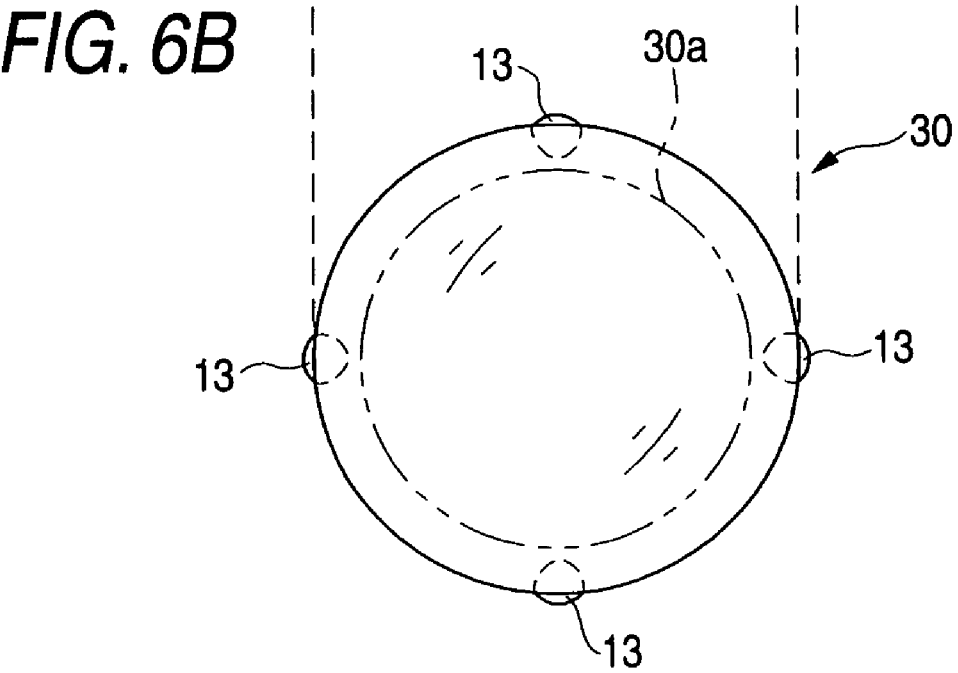

The embodiment has been described along an example where a cemented lens includes two lenses having different outer diameters. However, as shown in FIGS. 6A and 6B, a cemented lens 30 may include two lenses having one and the same outer diameter. The cemented lens 30 includes a first lens 31 having a concave surface 31a and a second lens 32 having a convex surface 32a. The lenses 31 and 32 have substantially one and the same outer diameter D. When the lenses 31 and 32 are cemented, for example, as shown in FIG. 6A, the adhesive 13 is applied onto the concave surface 3a of the first lens 31, and the convex surface 32a of the second lens 32 is then aligned with the concave surface 3a and bonded therewith. As shown in FIG. 6B, the adhesive 13 is applied to a plurality of places of the circumferential edge located out of an effective area 30a of the concave surface 31. Thus, the adhesive 13 is prevented from entering the effective area 31a. The two lenses may be aligned after the adhesive is applied. Alternatively, the adhesive may be applied to a joint between the outer circumferential ends of the two lenses to thereby bond the lenses with each other after the lenses are aligned with each other.

Figure 7:
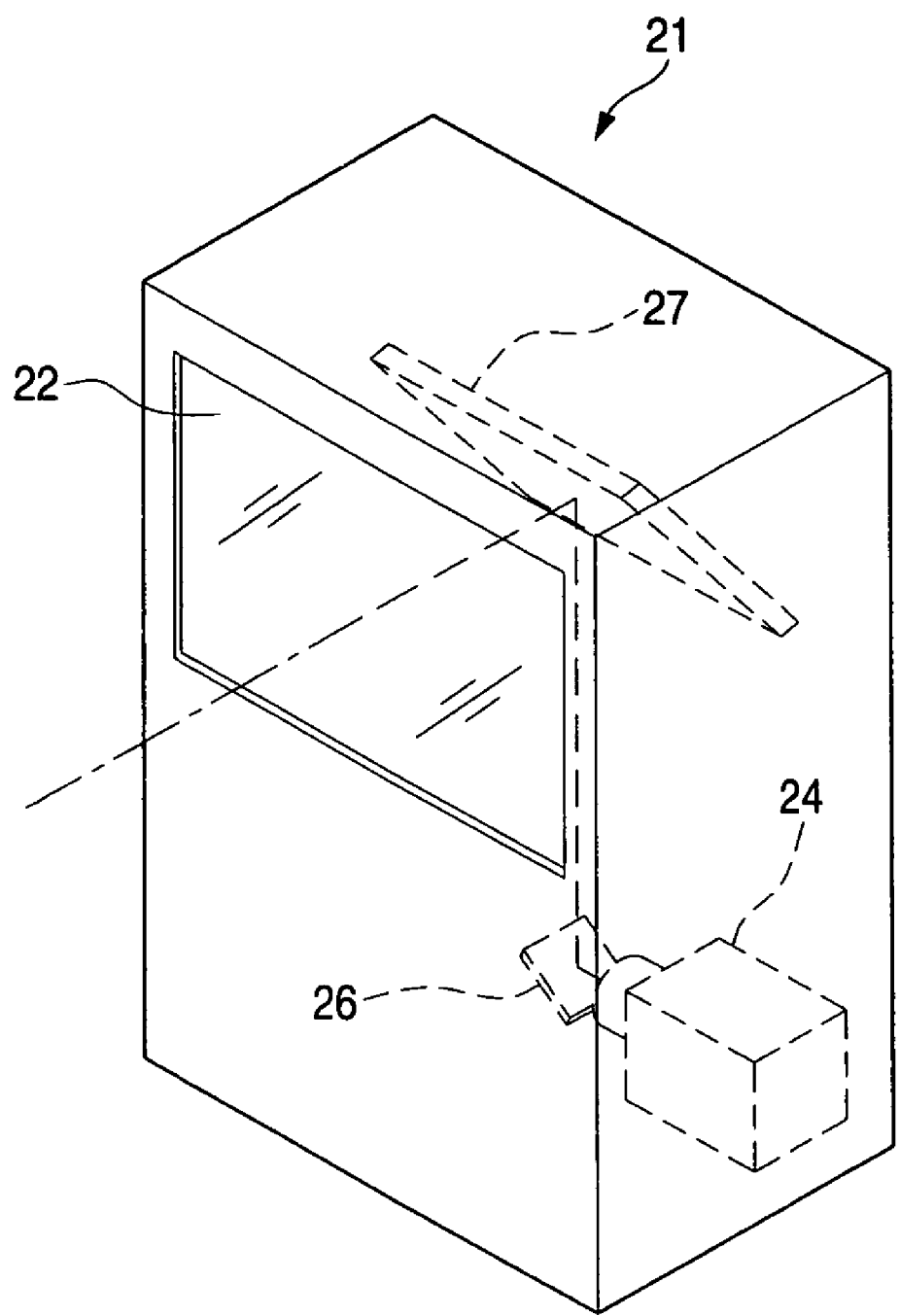
FIG. 7 is an explanatory view of a projector apparatus using the cemented lens.
Figure 8A:
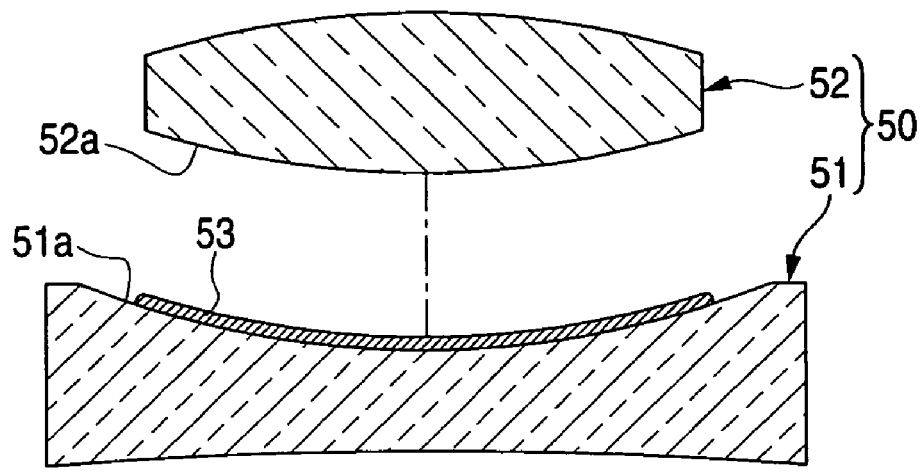
FIGS. 8A and 8B are explanatory views of a cemented lens according to the related art.
Figure 8B:
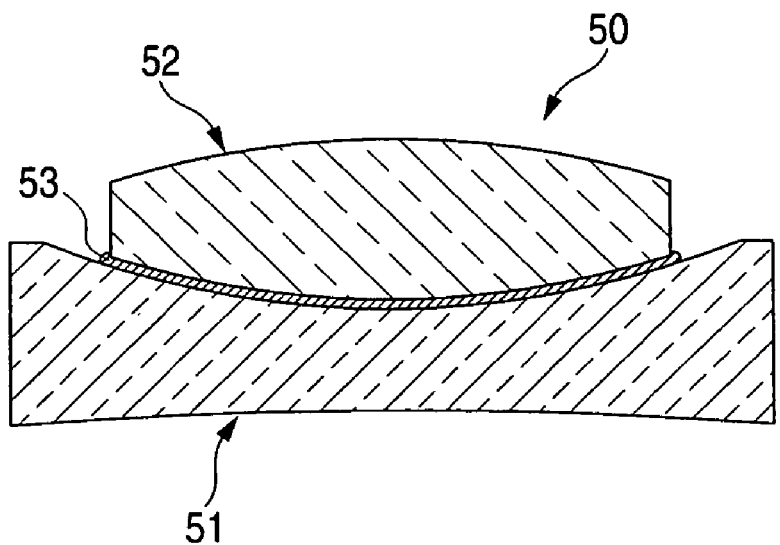

FIG. 7 shows a projector apparatus 20 in which the aforementioned cemented lens is used. The projector apparatus 20 is a projection-type image display apparatus for modulating light emitted from a light source so as to generate image light, and projecting the image light onto a screen to thereby display an image. In the projector apparatus 20, a diffuse transmission screen 22 is provided in front of a housing 21 so that an image formed on the back surface of the screen 22 can be viewed from the front side. A projection unit 24 is incorporated inside the housing 21. Image light is projected from the projection unit 24. The image light is reflected by mirrors 26 and 27, and forms an image on the back surface side of the screen 22. When the projector apparatus 20 is provided with a tuner circuit for distributing frequencies of TV signals, a video/audio reproducing circuit, etc., the projector apparatus 20 can be used as a large screen television set.

For example, the projection unit 24 has a white light source, a lighting optics, a light modulation portion, and a projection optics. The lighting optics condenses light emitted from the white light source, and outputs a uniformized beam. The light modulation portion optically modulates the beam outputted from the lighting optics in accordance with a video signal, so as to generate image light. The projection optics includes a projection lens for projecting the generated image light on the screen. The cemented lens is, for example, used as one of a lens group constituting the projection optics. The cemented lens is disposed near an exit pupil of the projection lens as a chromatic aberration correction lens for correcting chromatic aberration.

Not to say, applications of cemented lenses according to the invention are not limited to the projector apparatus, but the cemented lenses can be used as lenses constituting a variety of other optical systems.

The embodiment has been described along an example where a concave lens and a convex lens are used as the first and second lens, and the lenses are combined as a cemented lens. However, it is not necessary to combine a concave lens and a convex lens. It will go well if at least one lens surface of each of the first and second lenses has a concave surface or a convex surface serving as a cementing surface. The embodiment has been described along an example where a cemented lens includes two lenses. However, the invention may be applied to a cemented lens including three or more lenses.

What is claimed is:

1. A method for manufacturing a cemented lens comprising at least a first lens and a second lens, the cemented lens cemented through cementing surfaces of the first and second lenses, said cementing surfaces being smooth optical surfaces and having different outer diameters, one of the cementing optical surfaces being a concave surface of one of the first and second lenses, the other of the cementing optical surfaces being a convex surface of the other of the first and second lenses, the method comprising:

putting the cementing optical surfaces on each other;

thereafter applying an adhesive to a circumferential end portion, to a joint formed between a circumferential edge of the smooth optical surface of the larger diameter lens and an outer circumferential end of the smooth optical surface of the smaller diameter lens, in a state where the first and second lenses are put on each other so as to bond the first and second lenses with each other through the adhesive, the circumferential end portion being located out of effective areas serving as chief optical paths of the first and second lenses;

controlling said applying step such that a part of said adhesive penetrates between said concave surface and said convex surface but does not enter said effective areas, and another part of said adhesive protrudes to the outside of one of said first and second lenses, so as to bond said first and second lenses; and reducing a quantity of said adhesive which penetrates between said smooth optical surfaces of said lenses at said joint, by increasing a viscosity of said applied adhesive to have a value of 2,000 mPa·s or higher so that said adhesive does not reach said effective areas serving as chief optical paths for the first and second lenses.

2. The method according to claim 1, wherein:

the circumferential end portion includes circumferential edges of the cementing surfaces, and when there is a difference in diameter between the cementing surface of the first lens and the cementing surface of the second lens, the adhesive is applied to a joint between an outer circumferential end of the small-diameter one of the first and second lenses and the circumferential edge of the large-diameter one of the first and second lenses.

3. The method according to claim 1, wherein a curvature of the concave surface is equal to that of the convex surface.

4. The method according to claim 1, wherein a UV-curing adhesive to be cured by irradiation with ultraviolet light is used as the adhesive, the method further comprising:

after the UV-curing adhesive is applied to the circumferential end portion, adjusting a bonding position of one of the first and second lenses relative to the other; and thereafter irradiating the UV-curing adhesive with ultraviolet light so as to cure the UV-curing adhesive.

5. The method according to claim 1, wherein:

the adhesive is applied to at least three places in the circumferential end portion, and the places to be applied with the adhesive are disposed at substantially equal intervals.

6. A method for manufacturing a cemented lens comprising at least a first lens and a second lens, the cemented lens cemented through cementing surfaces of the first and second lenses, said cementing surfaces being smooth optical surfaces and having different outer diameters, one of the cementing optical surfaces being a concave surface of one of the first and second lenses, the other of the cementing optical surfaces being a convex surface of the other of the first and second lenses, the method comprising:

applying an adhesive to a circumferential end portion of the smooth optical surface of the larger diameter lens among said first and second lenses, the circumferential end portion being located out of effective areas serving as chief optical paths of the first and second lenses, said adhesive being applied on a circumference, in said circumferential end portion, where the outer circumferential end of the smooth optical surface of the smaller diameter lens will be located upon cementing;

reducing a quantity of said adhesive which extends on said smooth optical surface of the larger diameter lens, by increasing a viscosity of said applied adhesive to have a value of 2,000 mPa·s or higher so that said adhesive does not reach said effective areas serving as chief optical paths for the first and second lenses; and thereafter putting the cementing surface of the smaller diameter lens on the cementing surface of the larger diameter lens, so as to bond the first and second lenses with each other through the adhesive.

7. The method according to claim 6, wherein:

the circumferential end portion includes circumferential edges of the cementing surfaces, and the adhesive is applied to the circumferential edges.

8. The method according to claim 6, wherein a curvature of the concave surface is equal to that of the convex surface.

9. The method according to claim 6, wherein a UV-curing adhesive to be cured by irradiation with ultraviolet light is used as the adhesive, the method further comprising:

after the UV-curing adhesive is applied to the circumferential end portion, adjusting a bonding position of one of the first and second lenses relative to the other; and thereafter irradiating the LTV-curing adhesive with ultraviolet light so as to cure the UV-curing adhesive.

10. The method according to claim 6, wherein:

the adhesive is applied to at least three places in the circumferential end portion, and the places to be applied with the adhesive are disposed at substantially equal intervals.

11. A cemented lens comprising:

at least a first lens and a second lens, wherein:

the cemented lens is cemented through cementing smooth optical surfaces of the first and second lenses, said cementing surfaces having different outer diameters, one of the cementing smooth optical surfaces is a concave surface of one of the first and second lenses, the other of the cementing smooth optical surfaces is a convex surface of the other of the first and second lenses, the first and second lenses are bonded with each other through an adhesive applied to a circumferential end portion, said adhesive being initially applied to a joint formed between a circumferential edge of the smooth optical surface of the larger diameter lens and an outer circumferential end of the smooth optical surface of the smaller diameter lens, said circumferential end portion being located out of effective areas serving as chief optical paths of the first and second lenses, wherein a part of said adhesive penetrates between said concave surface and said convex surface without entering said effective areas, and another part of said adhesive protrudes to the outside of one of said first and second lenses, so as to bond said first and second lenses, said adhesive having a controlled viscosity with a value of 2,000 mPa·s or higher so that a quantity of said adhesive which penetrates between said smooth optical surfaces of the lenses at said joint is reduced, so that said adhesive does not reach said effective areas serving as chief optical paths for the first and second lenses.

12. The cemented lens according to claim 11, wherein the circumferential end portion includes circumferential edges of the cementing surfaces.

13. The cemented lens according claim 11, wherein a curvature of the concave surface is equal to that of the convex surface.

14. The cemented lens according to claim 11, wherein the adhesive is a UV-curing adhesive to be cured by irradiation with ultraviolet light.

15. The cemented lens according to claim 11, wherein:
the adhesive is applied to at least three places in the circumferential end portion, and
the places to be applied with the adhesive are disposed at substantially equal intervals.

16. A projector apparatus comprising:
a projection unit that optically modulates light from a light source to thereby generate image light, the projection unit that projects the image light on a screen to thereby display an image; and
a group of lenses incorporated in the projection unit, wherein:
the cemented lens according to claim 11 is used as one of the group of lenses.

17. A method for manufacturing a cemented lens comprising at least a first lens and a second lens, the cemented lens cemented through cementing smooth optical surfaces of the first and second lenses, said cementing optical surfaces having different outer diameters, one of the cementing optical surfaces being a concave surface of one of the first and second lenses, the other of the cementing optical surfaces being a convex surface of the other of the first and second lenses, the method comprising:
putting the cementing surfaces on each other; and
thereafter applying an adhesive to a circumferential end portion, to a joint formed between a circumferential edge of the smooth optical surface of the larger diameter lens and an outer circumferential end of the smooth optical surface of the smaller diameter lens, in a state where the first and second lenses are put on each other so as to bond the first and second lenses with each other through the adhesive, the circumferential end portion being located out of effective areas serving as chief optical paths of the first and second lenses, and
reducing a quantity of said applied adhesive which penetrates between said smooth optical surfaces of said lenses at said joint, by increasing a viscosity of said applied adhesive to have a value of 2,000 mPa·s or higher so that said adhesive does not reach said effective areas serving as chief optical paths for the first and second lenses.

* * * * *